United States Patent [19]

Marchand

[11] 4,338,782
[45] Jul. 13, 1982

[54] GAS TURBINE COMBUSTION SYSTEM UTILIZING RENEWABLE AND NON-CRITICAL SOLID FUELS WITH RESIDUE REMOVER TO MINIMIZE ENVIRONMENTAL POLLUTION

[76] Inventor: William C. Marchand, 11339 Roxbury, Detroit, Mich. 48224

[21] Appl. No.: 96,760

[22] Filed: Nov. 23, 1979

[51] Int. Cl.³ .............................................. F02C 3/26
[52] U.S. Cl. ........................... 60/39.46 S; 60/39.46 P; 60/744
[58] Field of Search ............... 60/39.46 S, 39.46 P, 60/39.82 P, 744, 745; 110/232; 431/9, 168

[56] References Cited

U.S. PATENT DOCUMENTS

| 1,618,808 | 2/1927 | Burg | 60/39.46 S |
| 2,625,791 | 1/1953 | Yellott | 60/39.46 S |
| 2,651,176 | 9/1953 | Yellott | 60/39.46 S |
| 2,699,039 | 1/1955 | Yellott | 60/39.46 S |
| 2,888,804 | 6/1959 | Yellott | 60/39.46 S |
| 2,911,065 | 11/1959 | Yellott | 60/39.46 S |
| 4,089,631 | 5/1978 | Giles | 431/9 |

FOREIGN PATENT DOCUMENTS

279770 11/1927 United Kingdom ........... 60/39.46 P

Primary Examiner—Louis J. Casaregola
Attorney, Agent, or Firm—Remy J. VanOphem

[57] ABSTRACT

Pressurized communited solid fuel particles are mechanically reground in a fuel injector prior to being radially injected in a swirling motion into a combustor where the fuel is mixed with oxidizing fluid in a swirling motion that is opposite to the swirling motion imported to the solid fuel particles and burned to form both solid and gaseous products of combustion. The products of combustion are passed through separator where the solid products of combustor are removed by inertia. Means are also provided for injecting liquid or gaseous fuels into the combustor to assist in the combustion process and meeting varying load demands on the engine.

7 Claims, 10 Drawing Figures

GAS TURBINE COMBUSTION SYSTEM UTILIZING RENEWABLE AND NON-CRITICAL SOLID FUELS WITH RESIDUE REMOVER TO MINIMIZE ENVIRONMENTAL POLLUTION

FIELD OF THE INVENTION

This invention relates to steady flow combustion systems and more particularly to a method and apparatus for the combustion of fluidized stream of finely comminuted or pulverized solid fuels in a gas turbine and for achieving improved particulate control by an inertia separation system so as to minimize turbine abrasion and environmental pollution.

BACKGROUND OF THE INVENTION

The United States consumes approximately 30% of the world's annual energy supplies. About 93% of our energy requirements are provided by fossil fuels of which nearly half are from crude oil sources. Since crude oil production in the United States has been falling off since reaching a peak in 1972-1973, crude oil is supplied largely from the Middle East. Recent events in the Middle East have sharply focused our over dependence on foreign crude oil supplies and have made apparent our need to develop alternate energy sources. Thus, our attention has focused on finding renewable or noncritical forms of energy to replace our current foreign crude oil supplies. Perennial growth matter such as wood, cotton trash, corn stalks, wheat chaff, forest residues, alfalfa, sunflower stalks, weeds, leaves, and other similar vegetation are in the category of renewable energy sources. Coal, because of its abundance here in the United States is considered a noncritical energy form. The widespread utilization of both the renewable and noncritical energy supplies has been hampered by a lack of suitable means by which we can directly convert these energy supplies to useful work in such applications as automobiles, aircraft, locomotives, trucks, buses, electric generators, pumps, etc. A most convenient energy conversion device with multi-fuel capabilities is a gas turbine engine.

The direct injection of solid fuels into gas turbine combustion systems requires proper preparation of the fuels prior to burning and the removal of combustion residues which have a detrimental effect on the turbine blades. In order to burn solid fuels in gas turbine systems, it has been found that the solid fuels must be ground, shredded or pulverized to an appropriate powder size.

The direct injection of solid fuels into gas turbine combustion systems dictates that the solid fuels be burned quickly and completely. It has also been found that considerable complexity and expense is incurred in the removal of combustion residues in order to protect turbine blades from abrasion. This is particularly true if coal is employed as a fuel in a gas turbine engine. It has been found that it is only necessary to remove the larger residues because solid particles of small micron size have minimal influence on turbine blade abrasion.

Several prior art designs have unsuccessfully attempted to solve the problem of solid fuel combustion and the effective removal of large combustion residues from the hot gas flow field so as to mitigate turbine blade erosion.

In U.S. Pat. Nos. 2,625,791 and 2,651,176 are described gas turbine combustion systems utilizing solid fuel injection as well as the removal of the harmful solid residues from the products of combustion. In each design, the combustion system comprises a pressurized fuel inlet for comminuted fuel incorporating a pneumatic pulverizing device and preheating means for simultaneously heating the fluidized solid fuel stream downstream of the pneumatic pulverizer and adding a supplementary accelerated stream of heated air to the solid fuel stream. This air and fuel mixture is then discharged into a combination preheater and cyclonizer, which is then discharged into a combination preheater and cyclonizer to effect further disintegration and devolutilization of the solid fuel. From the cyclonizer, this combustible fluid is injected into the center of a vertically disposed combustor. Combustion air is fed tangentially into the combustor through two feed zones. The first feed zone is designed to provide a quantity of air sufficient to completely burn the fuel injected into the combustor. The second feed zone is designed to reduce the temperature of the products of combustion including the residues to an operative optimum for the turbine blades. Downstream of the combustor, a discharge pipe with a foraminous screen is covered with a deflector plate to form a residue separator. Further downstream of this residue separator is a battery of small cyclone separators for discharging clean combusted air into the turbine section of the gas turbine.

In U.S. Pat. Nos. 2,888,804 and 2,911,065 are described further improvements in a gas turbine combustion system utilizing solid fuel injection and solid residue removing equipment. In each design, the combustion system therein described is a horizontally disposed combustor with a horizontally disposed fuel injector which is concentrically mounted in the combustor. The fuel injector comprises an inner fuel oil supply line and nozzle, an annular air duct surrounding the fuel oil supply line and nozzle and a third annular duct wherein air borne pulverized coal is discharged tangentially into the annulus between the second and third annular duct. In the combustor, combustion air is staged into the combustor to mix with the fuel emitted from the fuel injector to form a fluidized gaseous stream containing combustion residues. Downstream of the fuel injector and mounted to the end of the combustor is a terminal mixing and discharge section whereby the fluidized gaseous stream is diluted with cooler air to lower the temperature of the fluidized gaseous stream to the optimum turbine operating temperature. The fluidized gaseous stream and combustion residues are then discharged from the combustor and are projected against a curveform louvered upper surface of a plenum chamber. Cooler air flows through the louvered opening to quench the combustion residues impinging against it. The fluidized gaseous stream and combustion residues are then passed through a battery of vortex separators with the result that the combustion residues are trapped, removed, cooled and discharged from the fluidized gaseous stream. The cleaned fluidized gaseous stream is then discharged against the turbine blades.

All of the aforesaid designs were complicated and none were able to quench all of the combustion residues with the result that the combustion residue separators melted and burned out. In addition, none of the aforesaid designs considered the use of other renewable sources of energy such as those in the category of perennial growth vegetation.

A more recent design is shown in U.S. Pat. No. 4,089,631 wherein gas-fluidized ground coal and coal dust slurred with fuel oil, are supplied to a pressurized slagging reverse flow cyclone combustor. The combustor has a relatively long axial length in order to achieve good separative efficiency of the small particulates from the flow field. In addition, a base purge and conical vortex shield are incorporated in the combustor to inhibit reentrainment of fly ash into the exiting vortex core. Clean combustion air is admitted centrally into the cyclone combustor while gas-fluidized ground coal is introduced into the cyclone combustor near the cyclone wall by a relatively minor portion of the total combustion air to produce a hot gas temperature in the range of 2600 degrees F. to 2900 degrees F. The combustion process is such that the coal particulates, because of their swirling motion, move rapidly outward into the wall burning zone of the combustion chamber and the molten ash in the bottom of the combustion chamber tends to entrain fly ash particles from the wall region of the chamber. This design is large, bulky, and would not be easily incorporated in a mobile gas turbine powerplant that must be lightweight and compact. Furthermore, a turbine system incorporating this combustion scheme must operate at very high combustion temperatures in order to form slag which is required to entrain fly ash particles in order to assist in the clean-up of the combustion gas flow field. In addition, this concept requires using fuel oil in order to entrain small coal dust particles in a fuel slurry to enhance particulate control in the combustor.

SUMMARY OF THE INVENTION

The present invention relates to improvements in the direct utilization of solid fuels in gas turbine combustion systems which incorporates a combustion residue removal scheme for reducing turbine blade abrasion and minimizes environmental pollution. One improvement is the further repulverization of the pulverized solid fuel at the fuel injector tip and the radial injection of the repulverized solid fuel in the combustor in a swirling motion. Another improvement is the incorporation of an inertia separator design which will withstand a broad range of optimum turbine operating temperatures and will also trap and remove harmful residues from the fluidized gaseous stream which is simple, effective and inexpensive. A still further improvement is the ability of this design to operate effectively over a broad range of optimum turbine operating temperatures without the need for a slurry or the need to form a slag.

In accordance with the invention, an apparatus for burning solid fuel with air and for removing solid residues from the gaseous products of combustion is characterized by a combustion chamber, an ignition source mounted to the combustion chamber, means for repulverizing the powdered solid fuel to a predetermined particle size and for radially injecting the repulverized powdered fuel into the combustion chamber in a swirling motion. In addition, means are provided for supplying preheated air into the combustion chamber so that the preheated air mixes with the swirling pulverized powdered fuel and is ignited by the ignition source so as to form gaseous products of combustion and solid residues suspended in the gaseous products of combustion. Finally, means are provided for separating solid residues from the gaseous products of combustion.

Accordingly, one object of the invention is to enhance the combustion of the pulverized solid fuel by further repulverizing the pulverized solid fuel to a predetermined particle size in the fuel injector and to radially inject the repulverized powdered fuel into the combustion chamber in a swirling motion and to remove harmful residues from the products of combustion.

Another object is to provide a method and apparatus for the metering and direct radial injection of the repulverized solid fuel into gas turbine combustion systems, to operate over a broad range of optimum turbine operating temperatures, speeds and loads with minimal turbine blade abrasion.

Still another object is to provide a method and apparatus for the metering, the repulverizing and the direct radial injection of the repulverized solid fuel into a gas turbine combustion system which is simple and inexpensive, operates over a broad range of turbine operating temperatures and provides for the removal of combustion residues in an inertia separator in order to minimize turbine blade abrasion.

A further objective is to radially inject pulverized solid fuels for burning in gas turbine combustion systems inexpensively and compactly without the need for forming fuel slurries or hot slag to remove the solid fuel residues from the products of combustion.

A still further object is to provide a method and apparatus for metering the direct injection of pulverized solid fuels by further repulverizing powdered fuel to break-up and declog agglomerated powdered fuel in the fuel injector and to radially inject the solid fuel into the combustion chamber in a swirling motion so as to enhance the burning of the fuel with oxidizing fluid over a broad range of turbine operating temperatures and to remove the harmful fuel residues in the products of combustion in a separator so as to minimize turbine blade abrasion.

A still further object is to radially inject relatively small solid fuel particles in a swirling motion into a gas turbine combustion system for rapid combustion with swirling oxidizing fluid over a broad range of optimum turbine operating temperatures and to provide for the removal of combustion residues in an inertia separator so as to minimize turbine blade abrasion which is compact, lightweight, and inexpensive.

A still further object is to enhance the combustion of pulverized solid fuels in gas turbine combustion systems by further repulverizing of agglomerated pulverized fuel particles in the fuel injector, to meter and radially inject the reground pulverized fuel into the combustor in a swirling motion for rapid burning with swirling oxidizing fluid and to pass the swirling products of combustion through a separator to remove harmful solid residues so as to minimize turbine blade erosion efficiently, compactly and inexpensively.

Still another aspect of the invention is the ability to use solid and fluid fuels whereby the fluid fuel is burned with oxidizing fluid and the solid fuel is repulverized and the fuels are radially injected into a gas turbine combustion chamber in a swirling motion so as to enhance the burning of the fuels with oxidizing fluid which is swirling in the opposite direction in the combustion chamber over a broad range of optimum turbine operating temperature and to provide for the removal of combustion residues to minimize turbine blade erosion.

DETAILED DESCRIPTION OF THE DRAWINGS

Figure 1:
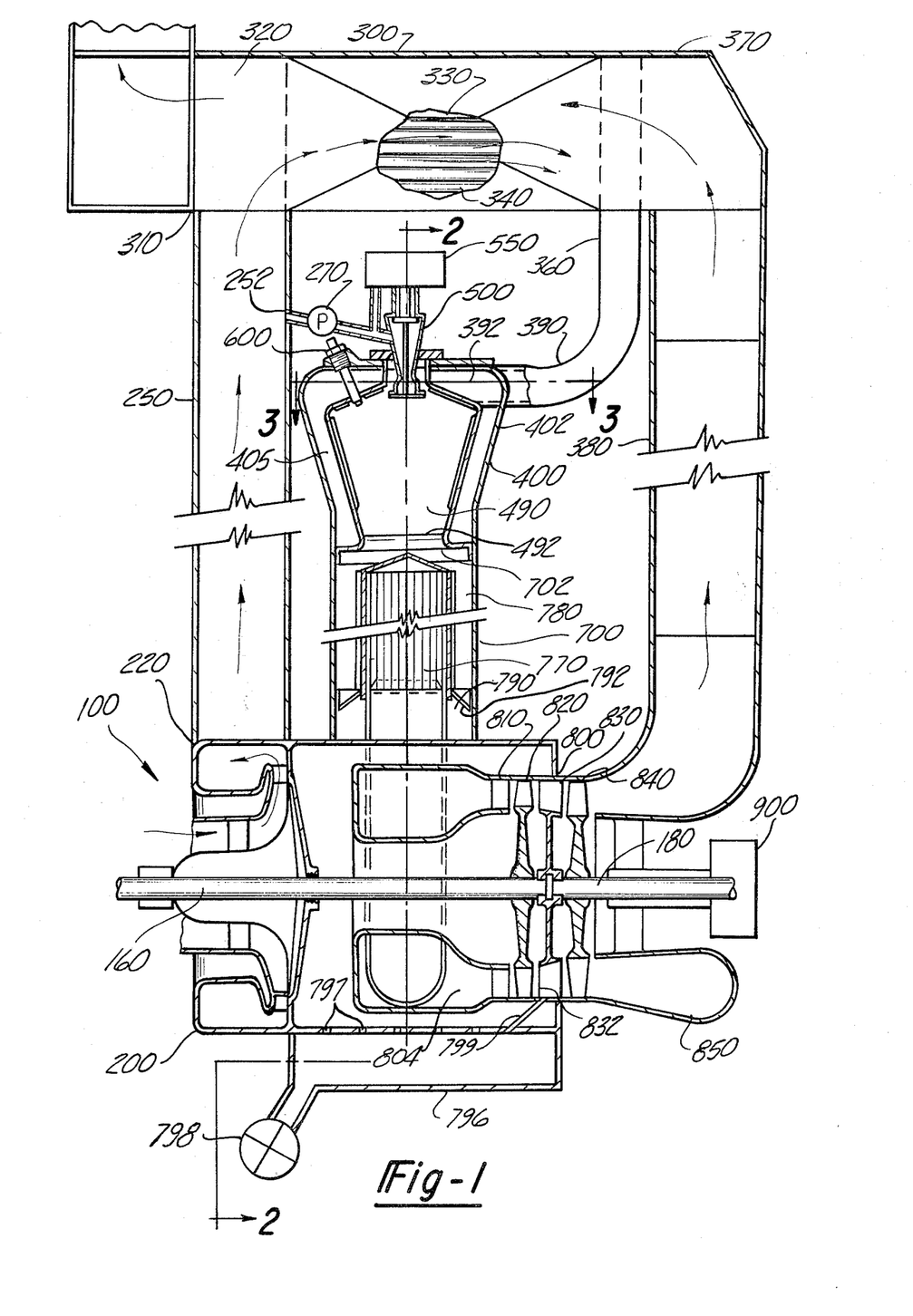
FIG. 1 is a sectional view of a gas turbine system employing the combustion system and residue removing arrangement of the invention.

Referring to FIG. 1, a gas turbine powerplant generally designated as 100 is illustrated. The powerplant 100 includes in spaced relationship a compressor 200, a heat exchanger 300, a combustor 400, a fuel injector 500, a fuel control 550, an ignitor 600, a separator 700, and a turbine 800. The turbine 800 comprises a nozzle 810, a gas generator turbine 820, a stator 830 and a power turbine 840. The gas generator turbine 820 is connected to a shaft 160 which is connected to the compressor 200. The gas generator turbine 820 provides power to drive the compressor 200. The power turbine 840 is connected to a shaft 180 which is connected to the external load means 900 (i.e. a generator, pump, transmission, compressor, fan, propellor, etc.). The power turbine 840 provides power to drive the external load means 900.

Figures 2, 3, 5, 10:
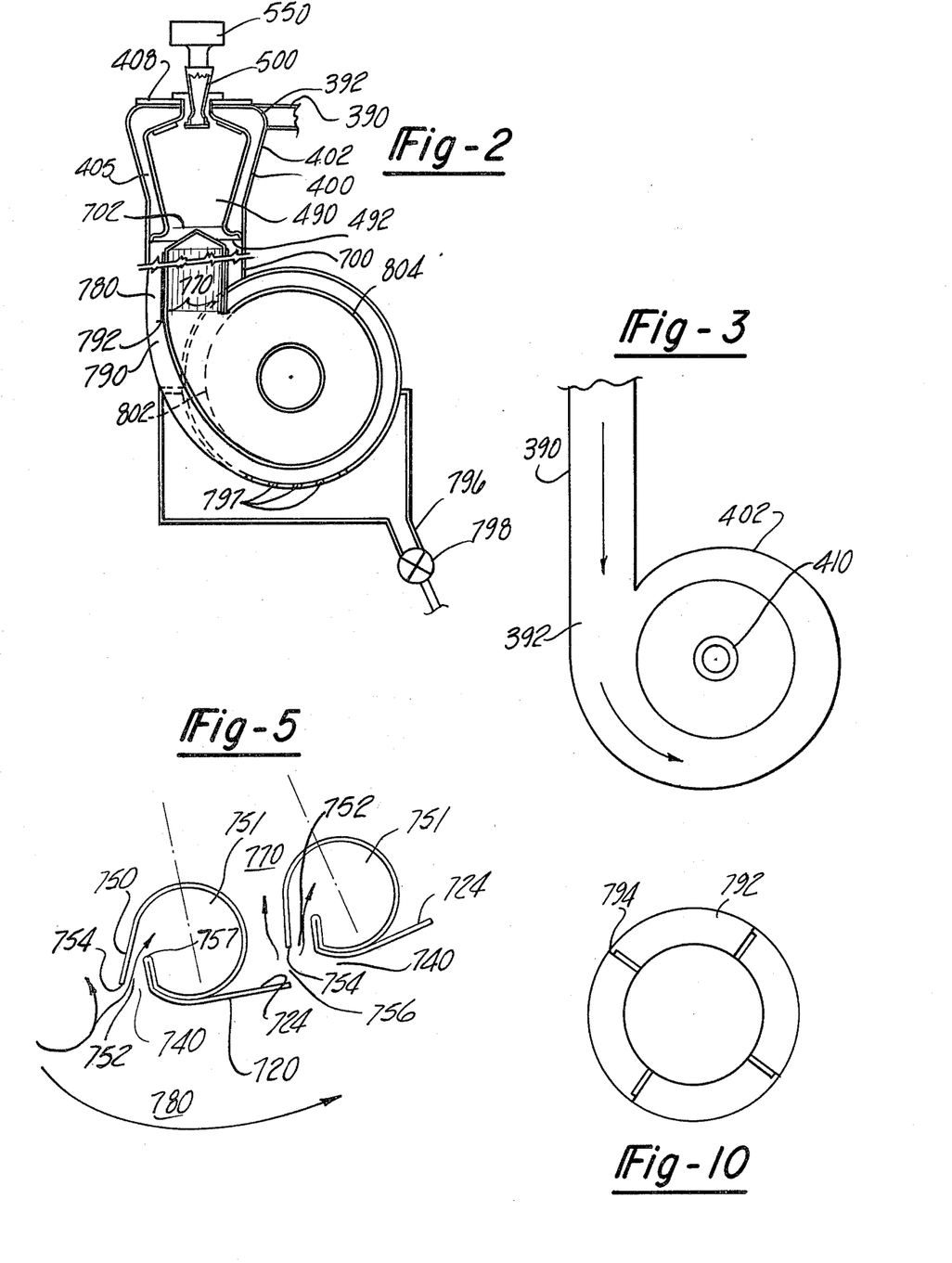
FIG. 2 is a sectional view of the combustion system, the residue removing arrangement of the invention and the turbine inlet scroll.
FIG. 3 is a sectional view of the oxidizing fluid tangential entry inlet to the combustor of the invention.
FIG. 5 is a sectional view along 5—5 of FIG. 4.
FIG. 10 is a plan view of the ring in the annulus of the separator.

Oxidizing fluid is drawn into the compressor 200 where the fluid is compressed. A tubular conduit 250 connects the compressor discharge portion 220 of the compressor 200 to the fluid inlet header 310 of the heat exchanger 300. The heat exchanger 300 consists of a plurality of passages 340 which connect the fluid inlet header 310 with a fluid exhaust header 360. An exhaust duct 380 connects the exhaust outlet 850 of the power turtine 840 with the exhaust inlet header 370 of the heat exchanger 300. The exhaust inlet header 370 is connected to the exhaust outlet header 320 by means of plurality of passages 330 in the heat exchanger 300. The oxidizing fluid from the conduit 250 is heated in the heat exchanger passages 340 by the exhaust gases from the duct 380 as they pass through passages 330. An inlet duct 390 connects the fluid exhaust header 360 of the heat exchanger 300 with the combustor housing 402 through a tangential entry port 392 to impart swirl into the oxidizing fluid as shown in FIGS. 1, 2 and 3.

As shown in FIGS. 4, 6, 7, and 8, the combustor 400 comprises a cylindrical tube 410 which is mounted to a truncated conical shaped dome 420 which is fastened by conventional means to a secondary tube section 430. The dome 420 is formed with a plurality of radial louvers 422 and slots 424 as shown in detail in FIGS. 6, 7. The secondary tube section 430 is formed with a plurality of axial or longitudinal louvers 432 as shown in detail in FIGS. 4, 6 and 8. The louvers 422, 432, and the slots 424 serve to inject swirling oxidizing fluid from flow passage 405 formed between the combustor housing 402 and the combustor 400 into the interior flow passage 490 of the combustor 400. The louvers 422, 432 serve further to assist the swirl in the fluid from flow passage 405 into the interior flow passage 490 of the combustor 400. The dome 420 further has a hole 426 drilled therethrough. The hole 426 is drilled into the dome 420 at a predetermined angular position so that the louvers 422, 432 are in a predetermined position with respect to the tangential entry port so that the swirling oxidizing fluid in the flow passage 405 is continued in the same swirl direction in the interior flow passage 490 of the combustor 400.

Figure 4:
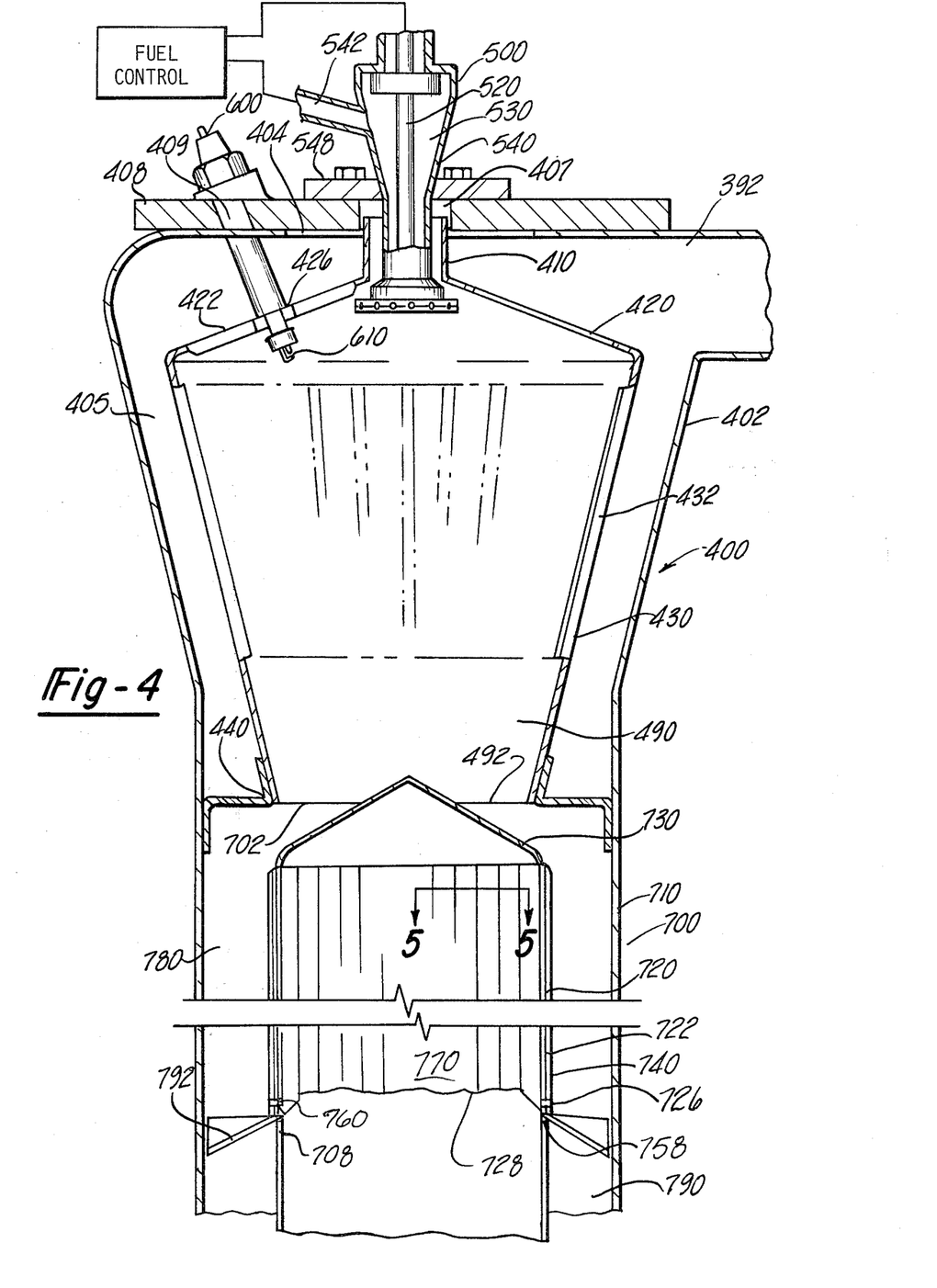
FIG. 4 is an enlarged sectional view of the combustion system and the residue removing arrangement of this invention.

As shown in FIG. 4, the combustor housing 402 has an opening 404 near the tangential entry port 392. A cover plate 408 is mounted over the opening 404 and to the combustor housing 402 as by conventional fastening means. The cover plate 408 further has an opening 407.

The cylindrical tube 410 of the combustor 400 is inserted into opening 407 in the cover plate 408. The tube 410 of the combustor 400 is attached to the cover plate 408 by conventional fastening means.

The cover plate 408 further has an aperture 409. An ignitor 600 is inserted into the opening 407 and fastened to the cover plate 408 by conventional fastening means. The dome 420 of the combustor 400 has an ignitor hole 426 into which the tip 610 of the ignitor 600 protrudes. The ignitor 600 serves as the ignition source for any fuel introduced into the combustor 400.

The fuel injector 500 is inserted into the tube 410 of the combustor 400. The fuel injector 500 is fastened to the cover plate 408 at its mounting plate 548 by conventional fastening means.

Figure 9:
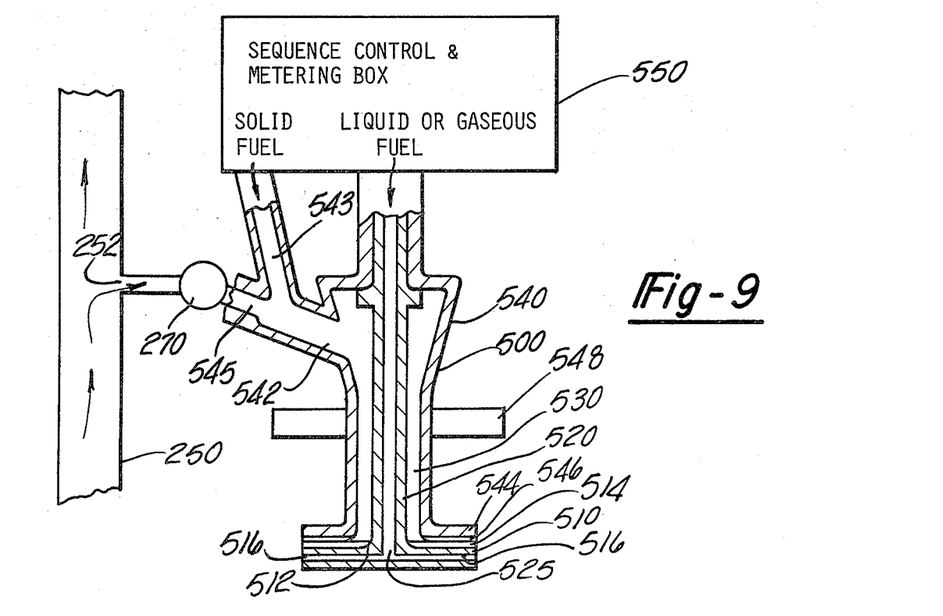
FIG. 9 is an enlarged sectional view of the injector.

As shown in FIGS. 2 and 9, the injector 500 comprises an inner body member 520 and an outer tube 540. Between the inner body member 520 and the outer tube 540 is an annular chamber 530. A solid fuel supply inlet port 542 is formed near one end of the outer tube. Pressurized, metered fluid comminuted solid fuel supplied from a solid fuel pulverizer (not shown) coupled with metered pressurized fluid which entrains the pulverized or shredded solid fuel is supplied to the fuel injector 500 at the inlet port 542 at a predetermined fluid pressure which is higher than the fluid pressures in the interior flow passage 405 of the combustor 400. The inner body member 520 of the fuel injector 500 is rotatably mounted to the outer tube 540 at one end by torque input means (i.e. electric motor drive, mechanical drive, hydraulic drive, etc.). A circular disc 510 is welded or fastened by any suitable means to the other end of the inner body member 520. The other end of the outer tube 540 terminates with a flange 544 which has a plurality of first serrations 546 formed on the surface. The disc 510 has a surface 512 which has a plurality of second serrations 514 formed thereon. The second serrations 514 formed on the disc surface 512 are aligned axially and radially in working relationship with respect to the first serrations 546 on the surface of the flange 544.

The pressurized fluid comminuted solid fuel is further repulverized within the fuel injector 500 when the disc surface 512 rotates relative to the flange 544 of the outer tube 540 when the solid fuel particles lodge in the first and second serrations 546, 514. Furthermore, since the fluid comminuted solid fuel is supplied to the fuel injector 500 at a fluid pressure that is higher than the fluid pressure at the interior flow passage 490 of the combustor 400, the fluid pressure differential across the first and second serrations 546, 514 and the rotation of the disc surface 512 causes the repulverized solid fuel to be radially injected into the interior flow passage 490 of the combustor 400 in a swirling motion that is opposite to the swirling motion imparted to the oxidizing fluid from louvers 422, 432.

The fuel injector 500 further has a fuel flow passage 525 in the inner body member 520. The passage 525 terminates before the disc surface 512. The passage 525 is connected with the interior flow passage 490 of the combustor 400 by a plurality of holes 516 radially drilled through the disc 510. The passage 525 permits the flow of liquid or gaseous fuel therethrough for distributing the fuel radially out of the holes 516 into the interior flow passage 490 of the combustor 400.

The fuel injector 500 further has a mounting flange 548 which is welded or brazed to the outer tube 540 at a predetermined distance from the disc 510. The fuel injector 500 is inserted through the cover plate 408 and combustor tube 410 and the mounting flange 548 is fastened to the cover plate 408 as by conventional fastening means.

As shown in FIG. 9, the fuel control 550 meters the supply of solid pulverized fuel into one leg 543 of the fuel supply inlet port 542. The other leg 545 of the port 542 is connected to an oxidizing fluid pressure booster 270 which is connected to the tubular conduit 250 at 252 to supply a metered supply of oxidizing fluid at leg 545. The solid fuel in leg 543 is entrained by the oxidizing fluid in leg 545 in port 542 so that pressurized fluid comminuted solid fuel enters into the annular chamber 530 of the fuel injector 500. The fuel control 550 also meters a supply of liquid or gaseous fuel into the flow passage 525 of the fuel injector 500 for starting or for supplementing the solid fuel supply as required.

As shown in FIG. 4, the terminal end 492 is inserted in a seal 440 so interior flow passage 490 of the combustor is connected to the inlet 702 of the housing 710 of the separator 700. The separator 700 comprises a hollow cylindrical tube 720 with a truncated dome 730 connected thereto. An outer flow passage 780 is formed between the housing 710 and the tube 720. The tube 720 has a plurality of longitudinal slots 740 formed about the outer periphery 722 of the tube 720. A plurality of longitudinal separator tubes 750 are connected longitudinally to the tube 720 along nearly the entire length of the inside surface 724 of hollow tube 720 as shown in FIG. 5. The separator tubes 750 are formed with a flow passage 751 and with a longitudinal first opening 752 along the entire length of the tube 750 near the slots 740. The first opening 752 is formed between the edge 754 that forms the tube 750 and the edge 757 on the tube 750. A gap 756 is formed between the edge 754 and the inner surface 724 of the hollow tube 720. The first opening 752 and the gap 756 are formed in the separator 700 in a predetermined relationship to the swirling motion of the gaseous products of combustion and residues as shown in FIG. 5. The tubes 750 terminate at 758 with a bottom cap 760 near the end 728 of the tube 720.

The end 728 of the tube 720 is mounted within a seal 708 in the housing 710. At the end 728 of the tube 720, a plurality of holes 726 connect the flow passages 751 with the outer flow passage 780. The plurality of slots 740 serve to cause the swirling gaseous products of combustion and residues flowing out of the combustor inner flow passage 490 and passage 780 to take a sharp turn from the flow passage 780 in through the longitudinal slots 740 in the hollow tube 720. Thus, the gaseous products of combustion and residues from the outer flow passage 780 flow in through the longitudinal slots 740. The gaseous products of combustion then flow in through gaps 756 which causes a rapid change in direction. This rapid change in direction causes a substantial portion of the heavier residues to separate from the gaseous products of combustion and thus flow into the opening 752, into the flow passage 751 and then drop to the bottom 758 of the tubes 750 then through holes 726 and into the annulus 790 which is formed at the bottom of the outer flow passage 780. A ring 792 formed with a plurality of radial slots 794 is fitted within the annulus 790 to retain the residues in the annulus 790 as shown in FIG. 10. As shown in FIGS. 1 and 2, a plenum 796 is connected through a plurality of holes 797 to the annulus 790. The collected residues are discharged out of the annulus 790 through the holes 797 into the plenum 796 and then discharged out of the engine through valve 798. The cleaned gaseous products of combustion flow into the interior flow passage 770 of the hollow tube 720 into a tangential inlet entry passageway 802 which is connected to the turbine plenum chamber 804 of the turbine engine. The separated residues and a predetermined quantity of gaseous product of combustion flow through the annulus 790 and through holes 797 into plenum 796. The gaseous products of combustion are permitted to flow from the annulus 790 through a plenum 796, passage 799 and then into the leading edge 832 of the stator 830 of the power turbine 840 as shown in FIGS. 1 and 2.

The cleaned gaseous products of combustion and remaining harmless resides flow from the plenum chamber 804 into the nozzle 810 of the turbine 800 as shown in FIG. 2. The turbine 800 comprises a nozzle 810 which is mounted axially in spaced relation with a gas generator turbine 820, a stator 830, a power turbine 840 and an exhaust outlet of the power turbine 840 which is connected to an exhaust duct 380 as shown in FIG. 1.

OPERATION

The operation of the combustor 400, fuel injector 500, the fuel control 550, the ignitor 600, and the separator 700 will now be described. As shown in FIG. 1, high pressure compressed oxidizing fluid from the discharge portion 220 of the compressor 200 is directed through duct 250 into the heat exchanger 300. In the heat exchanger 300 the compressed fluid is heated as it flows into inlet 310 then through passages 340 by the exhaust fluid which flows in the passages 330 connected to the exhaust duct 380 from outlet of the power turbine 840 as is well known in the prior art.

Figures 6, 7, 8:
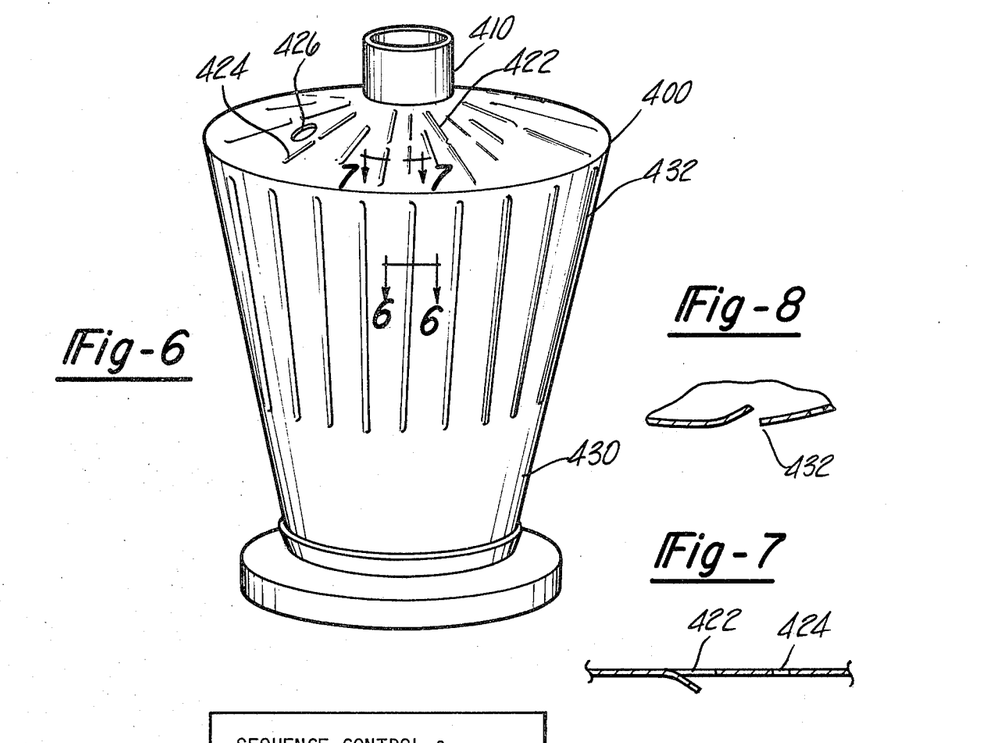
FIG. 6 is a perspective view of the combustor.
FIG. 7 is an enlarged sectional view of the combustor along 7—7 in FIG. 6.
FIG. 8 is an enlarged sectional view along 6—6 of the combustor in FIG. 6.

The heated compressed fluid is then directed from the heat exchanger 300 through an inlet duct 390 into a tangential entry port 392 of the combustor 400 as shown in FIG. 3. From the entry port 392, the heated compressed fluid flows in a predetermined swirling motion into a flow passage 405 formed between the combustor 400 and the combustor housing 402 as shown in FIG. 4. The heated compressed oxidizing fluid flows through a plurality of tangential louvers 422, 432, and slots 424 formed in the combustor 400 as shown in FIGS. 4 and 6. The louvers 422 in the dome 420 and the louvers 432 in the secondary tube 430 are oriented on the combustor 400 so as to inject the compressed fluid from passage 405 into the interior flow passage 490 and to maintain the same swirling motion in passage 405 as in passage 490. The radial slots 424 inject compressed fluid into the passage 490 so as to promote flow turbulence and thus promote mixing and combustion with the fuel.

As shown in FIG. 9, pressurized solid fuel from a solid fuel pulverizer (not shown) is connected to a fuel control 550 which is then connected to the inlet port 542 of the fuel injector 500. Oxidizing fluid is fed into the injector through port 542 where the fluid mixes with the pulverized solid fuel in the port 542 and flows into the annular chamber 530 of the fuel injector 500 and down towards the serrated discs, 514, 546. The fluid pressure in the chamber 530 is maintained by a boost pump 270 at a predetermined fluid pressure which is higher than the fluid pressure in the interior flow passage 490 of the combustor 400. Thus, the pulverized solid fuel particles in the annular chamber 530 are forced into and through the serrations 514, 546 by the pressure differential between the pressure in the annular chamber 530 and the pressure in the interior flow passage 490. Since the serrations 514 on the disc 510 are rotated with respect to the serrations 546 on the flange 544, any fuel particles coagulated by humidity or any other source are forced into the serrations 514, 546 and are repulverized. The repulverized fuel is then radially injected into the interior flow passage 490 of the combustor by the serrations 514 of the rotating disc 510 and the pressure differential between the fluid pressure in the chamber 530 and the interior flow passage 490. The repulverized fuel particles are distributed in the combustor 400 so as to be radially injected into the passage 490 with a swirling motion that is opposite the swirling motion of the compressed oxidizing fluid. The fuel particles are thus given greater residence time for completing the combustion process in the combustor than would be possible without the swirling motion. It is obvious to those skilled in the art that any combustible solid matter that is capable of being shredded, pulverized, ground, micronized or granulated is suitable for use with my invention. Thus, any plant matter or fossil fuel may be used as solid fuel in this invention.

The repulverized solid fuel that is radially injected into the combustor 400 mixes with the compressed oxidizing fluid that is injected into the combustor dome 420 through louvers 422 and slots 424 to form a combustible mixture of fuel and oxidizing fluid as shown in FIG. 4. The louvers 422 inject the compressed oxidizing fluid from passage 405 in a semi-turbulent flow mode into the interior flow passage 490 in the dome.

Thus, a swirling film of semi-turbulent compressed oxidizing fluid from the louvers 422 forms near the combustor dome 420 in the interior flow passage 490 and acts to cool the surface of the dome 420. The radial slots 424 also inject compressed fluid from passage 405 into the interior flow passage 490 in a manner so as to turbulate the fluid flow from the louvers 422 and to thus promote local turbulence. This local turbulence promotes mixing with the repulverized solid fuel particles such that in the presence of a flame ignitor 600 or other ignition source (i.e. heat or flame) combine to form gaseous products of combustion and solid residues. This mixing zone is called the primary combustion zone.

The louvers 432 inject compressed fluid from the flow passage 405 into the interior flow passage 490 in a laminar flow mode along the secondary tube to cool the secondary tube 430 in the same swirling motion as the louvers 422 form along the interior flow passage 490. The louvers 432 also serve to inject relatively cooler oxidizing fluid from flow passage 405 in a swirling motion into the passage 490 to reduce the temperature level of the combustor dome 420 and the secondary tube 430. Injecting the swirling oxidizing fluid in the dome 420 helps to increase the residence time of the radially injected fuel particles which are swirling in the opposite swirl direction. In the secondary tube 430, the temperature level of the gaseous products of combustion and the unburnt fuel residues are reduced by the fluid injected by louvers 432 to a temperature that is compatible with temperature capabilities of the inertia separator 700 and the turbine 800.

Since it is easier to burn liquid or gaseous fuels, it is within the scope of the invention to initiate the combustion process in the combustor 400 with either gaseous or liquid fuels from the injector 500. Once the combustion process is self-sustaining on the liquid or gaseous fuels, the fuel control 550 is made to start the flow of solid fuel into the injector 500 and to gradually reduce or shut off the liquid or gaseous fuel to the fuel injector. It is also within the scope of this invention to use liquid or gaseous fuel to provide for additional fuel in order to meet varying load or power conditions or to prevent flame out of the combustion process while operating on repulverized solid fuel. It is also obvious to those skilled in the art that a liquid or gaseous fuel pilot flame from the fuel injector 500 may be maintained in the interior flow passage 490 to assist in stabilizing the combustion of the repulverized solid fuel and the oxidizing fluid.

As stated above, the gaseous products of combustion and solid residues flow from the interior flow passage 490 of the combustor 400 in a swirling motion. This same swirling motion is carried into the flow passage 780 of the inertia separator 700. The orientation of the slots 740 in the tube 720 of the separator 700 with respect to the swirling flow motion of the products of combustion is such that an approximately 180 degree turn in the flow path is required in order for the products of combustion to flow through the slots 740, and gap 756 and thence into the interior flow passage 770 of the hollow tube 720 as shown in FIG. 5. The rapid change in direction causes a substantial portion of the solid residues to leave the gas stream by inertia. The separated solid fuel residues flow through slot 740 and then the first opening 752 into the tube 750 where the residues are trapped and fall to the bottom of the flow passage 751 by gravity due to their greater weight than the gas stream, out holes 726 and are collected in the annulus 790. The separation of the fuel residues is also assisted by a predetermined bleed of gaseous products of combustion gases into the annulus 790 as will be discussed in detail later. It is also possible for some of the solid residues to separate from the gas stream in the flow passage before entering the inertia separator 700. These residues would fall by gravity and are collected in the annulus 790. A ring 792 with a plurality of radial slots 794 fits within the annulus 790 and acts to hold the collected residues within the annulus. A plenum 796 connected to the annulus 790 as by holes 797 and then out of the engine through discharge valve 798. Thus, residues collected in the annulus 790 are held down by the ring 792 which keeps the residues from leaving and thence the residues fall through holes 797 and then into plenum 796 and then out discharge valve 798.

As shown in FIGS. 1 and 2, the clean products of combustion flow into a tangential inlet entry passageway 802 and thence into the plenum chamber 804. The cleaned gaseous products of combustion and remaining harmless residues flow from plenum chamber 804 into the nozzle 810 of the turbine 800, through the gas generator turbine 820, then through the stator 830 and the power turbine 840, then into the outlet 850 of the turbine 800 and then into the exhaust passageway 380.

A predetermined quantity of gaseous products of combustion is permitted to be drawn into the plenum 796 through holes 797 to aid in the withdrawing of residues from the annulus 790. The gaseous products of combustion flow from the plenum 796 into the passage 799 and then to the leading edge 832 of the stator 830 of the power turbine 840. Since the air flows through passage 799, little or no residues will be entrained by the products of combustion.

Additional exhaust separator means can be installed between the power turbine outlet and the heat exchanger 300 to reduce the emission of solid residues from the engine.

In addition, an alternate electrostatic precipitator downstream of the heat exchanger 300 can also be provided to further reduce the emission of solid residues from the engine.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

What I claim is:

1. A combustor apparatus for burning solid fuel with oxidizing fluid and for removing solid residues from the products of combustion, said apparatus comprising:

a combustion chamber;

means for pulverizing said solid fuel and for injecting said pulverized solid fuel into said combustion chamber, said pulverizing and injecting means being mounted into said combustion chamber, said means for pulverizing and for injecting said pulverized solid fuel further comprising:
   an injector having an outer body and an inner body rotatably mounted with respect to said outer body;
   means for repulverizing coagulated pulverized solid fuel, said repulverizing means being integral with said inner and outer body of said injector; and
   means for injecting the repulverized solid fuel into said combustion chamber;

means for supplying oxidizing fluid into said combustion chamber, said supplying means mixing said fluid with said repulverized solid fuel to form a mixture of combustion;

means for igniting said mixture of combustion, said igniting means being mounted to said combustion chamber such that the mixture of combustion in said combustion chamber is ignited to form gaseous products of combustion and solid residues suspended in said gaseous products of combustion; and means for separating said solid residues from the gaseous products of combustion, said separating means further comprising an inertia separator mounted downstream of said combustor.

2. A combustor apparatus for burning pulverized solid fuel, liquid fuel or gaseous fuel with preheated air and for removing solid residues from the products of combustion, said apparatus comprising:

a combustion chamber having an inner flow passage and outlet means;

means for pulverizing said solid fuel to a predetermined particle size and for injecting said pulverized solid fuel into said inner flow passage of said combustion chamber in a first predetermined direction, said means for pulverizing and for injecting said pulverized solid fuel further comprising:
   an injector having an outer body and an inner body rotatably mounted with respect to said outer body;
   means for repulverizing said pulverized solid fuel to said predetermined particle size, said repulverizing means being integral with said inner and outer body of said injector such that coagulated pulverized solid fuel is repulverized to said predetermined particle size; and
   means for injecting said repulverized solid fuel into said inner flow passage of said combustion chamber;

means for supplying preheated air into said inner flow passage of said combustion chamber, said supplying means contiguous said combustion chamber such that preheated air enters said inner flow passage of the combustion chamber and mixes with the repulverized solid fuel to form a first mixture of combustion;

means for igniting said mixture of combustion, said igniting means being mounted to said combustion chamber so as to extend into said inner flow passage such that the mixture of combustion in said inner flow passage is ignited to form gaseous products of combustion and solid residues suspended in the gaseous products of combustion; and means for separating said solid residues from the gaseous products of combustion, said separating means being connected to the outlet means of said combustion chamber.

3. The apparatus as claimed in claim 2 wherein said means for separating further comprises an inertia separator mounted to said outlet means of the combustion chamber.

4. The apparatus as claimed in claim 2 wherein said means for igniting comprises a flame ignitor mounted to said combustor.

5. The apparatus as claimed in claim 2 further comprising:

means for injecting liquid fuel into said inner flow passage of the combustion chamber; and means for mixing said liquid fuel with said preheated air so as to form a second mixture of combustion such that when said second mixture of combustion is ignited by said igniting means said second mixture of combustion forms gaseous products of combustion.

6. The apparatus as described in claim 2 further comprising:

means injecting gaseous fuel into said inner flow passage of the combustion chamber, said injecting means being connected to said combustion chamber; and means for mixing said gaseous fuel with said preheated air so as to form a second mixture of combustion such that when said second mixture of combustion is ignited by said igniting means said second mixture of combustion forms gaseous products of combustion.

7. A combustor apparatus for burning solid granulated fuel with preheated air and for removing solid residues, said apparatus comprising:

a combustion chamber comprising:
   an inner flow passage;
   an outer flow passage surrounding said inner flow passage;
   a tubular member separating said inner flow passage from said outer flow passage, said tubular member further having a dome portion at one end and an outlet at the other end of said tubular member;
   means for imparting a swirl motion to said preheated air in said outer flow passage, said imparting means swirling said preheated air in a first predetermined direction;
   means for injecting repulverized solid fuels into said inner flow passage, said injecting means injecting said solid fuel in said dome portion of the tubular member in a second predetermined direction opposite to said first predetermined direction so as to impart a swirling motion to said solid fuel in said inner flow passage;

means for supplying swirling preheated air from said outer flow passage to said inner flow passage, said supplying means being integral with said tubular member so that air flows from said outer flow passage through said supplying means and into said inner flow passage to mix with the solid fuel in said tubular member and form a mixture of combustion;

means for igniting said mixture of combustion, said igniting means being mounted to said combustion chamber so as to extend into said inner flow passage, such that the mixture of combustion in said inner flow passage is ignited to form gaseous products of combustion and solid residues suspended in the gaseous products of combustion;

means for separating the solid residues from the gaseous products of combustion, said separating means mounted downstream of said outlet of the combustion chamber, said separating means further comprising:

a tubular member mounted downstream of said combustion chamber, said tubular member having a conical end portion and a plurality of slots formed in the outer periphery of the tubular member; said tubular member further having an outer flow passage and an inner flow passage a plurality of slotted members mounted longitudinally to the inside surface of said tubular member, each of said plurality of slotted members having a central passage, each of said plurality of slotted members further being located in spaced relation to each of said slots in the outer periphery of the tubular member to form a first flow passage communicating said outer flow passage to said inner flow passage and a second flow passage communicating said outer flow passage to said central passages of the plurality of slotted members such that the products of combustion in said outer flow passage of the tubular member mounted downstream of said combustion chamber enter said plurality of slotted members and become separated into said first and second flow passages whereby said solid residues are separated from said products of combustion and flow into said central passages along said second flow passage;

means for collecting said solid residues flowing in said central passage, said collecting means being contiguous to said tubular member downstream of said combustion chamber; and means for cooling the solid residues and the gaseous products of combustion to a predetermined temperature.

* * * * *